Figure 1:
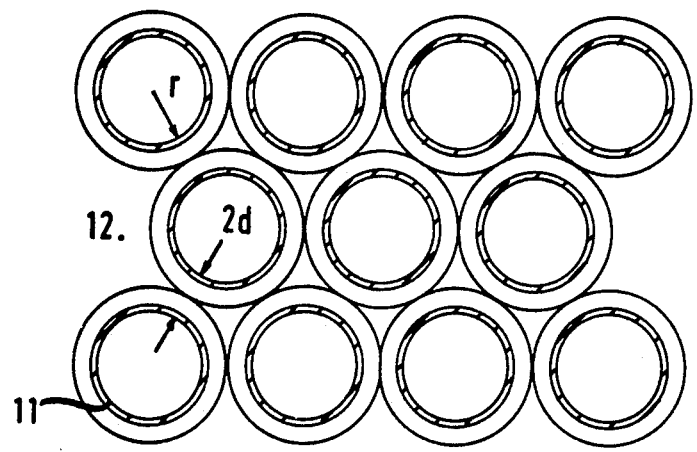

United States Patent [19]

Lees et al.

[11] 4,105,458
[45] Aug. 8, 1978

[54] ROAD SURFACES

[75] Inventors: Geoffrey Lees, Stratford upon Avon; Arthur Roger Williams, Birmingham; Robert Bond, Lichfield, all of England

[73] Assignee: Dunlop Limited, London, England

[21] Appl. No.: 664,655

[22] Filed: Mar. 8, 1976

Related U.S. Application Data

[63] Continuation of Ser. No. 510,702, Sep. 30, 1974, abandoned.

[30] Foreign Application Priority Data

Oct. 9, 1973 [GB] United Kingdom ............... 47060/73

[51] Int. Cl.² ................................................ C04B 7/02
[52] U.S. Cl. ........................................ 106/97; 106/98; 106/281 R; 404/19; 404/20
[58] Field of Search ............... 106/281 R, 273 R, 97, 106/98; 404/19, 20

[56] References Cited

U.S. PATENT DOCUMENTS

| 1,975,028 | 9/1934 | Wallace | 404/20 |
| 3,081,186 | 3/1963 | Burns | 106/281 R |
| 3,957,525 | 5/1976 | Lees et al. | 106/281 R |

Primary Examiner—Lorenzo B. Hayes
Attorney, Agent, or Firm—Stevens, Davis, Miller & Mosher

[57] ABSTRACT

A road surface comprising a blend of at least two aggregate materials disposed in a binder matrix and having different rates of wear as judged by the aggregate test B.S.812 1967, each aggregate material comprising individual aggregate particles of a size such that they will be retained on a British Standard ¼ inch sieve, or its metric equivalent, and will pass through a British Standard ⅜ inch sieve, or its metric equivalent, and having a surface micro-texture in the range defined by asperity heights of a minimum texture depth of 5 microns and a maximum texture of 500 microns, the individual aggregate particles being disposed in the binder matrix so that the shortest distance between any two adjacent particles is 1 to 6 mm and the texture depth of the aggregate particles in the binder matrix is between 1 and 5 mm, of which the following is a specification.

4 Claims, 4 Drawing Figures

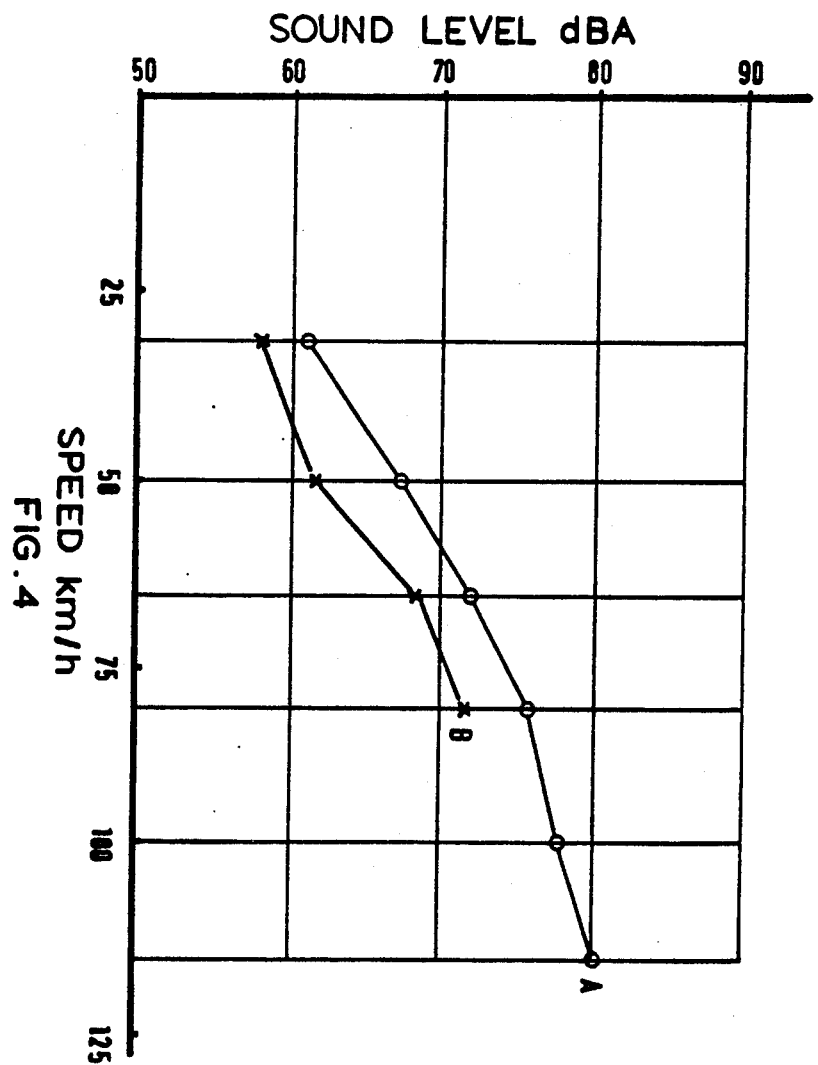

ROAD SURFACES

This is a continuation of application Ser. No. 510,702 filed Sept. 30, 1974 now abandoned.

The present invention relates to road surfaces and is an improvement in or modification of the invention described in U.K. patent applications Ser. Nos. 11,237/71 and 53,096/71, corresponding to U.S. application Ser. No. 449,759 filed Mar. 11, 1974 which is a continuation application of application Ser. No. 245,159 filed Apr. 18, 1972 and now abandoned.

Concrete and bituminous road surfaces consist of aggregate particles designed to a specified grading and bonded together in a binder matrix which in the case of concrete may be based on Portland cement and in the case of a bituminous binder may be bitumen, tar or lake asphalt, or sometimes a combination of any of these bituminous binders. The aggregate particles take the form of small pieces of stone of various sizes up to about one and a half inches.

In the running of a tire over a road surface the interaction between the road surface and the tire enables the tire to be braked, accelerated and steered. Under wet conditions the water acts as a lubricant and it is necessary for the tire to break through the film of water on the surface to achieve an adequate grip. The grip achieved in a particular case depends on the efficiency of the interacting road surface and tire in removing the water from the tire contact area and in achieving some contact between the road surface and actual tire rubber.

The contribution of the road surface to this interaction is dependent upon two factors; its macro-texture, meaning its texture when considering the spatial arrangement of the aggregate particles in the binder matrix, and its micro-texture, meaning its texture when considering the actual surface texture of the individual aggregate particles. Ideally, an open macro-texture is desirable to enable water to run away or be forced away from a particular area through the open texture material and the micro-texture should be sharp enough to give good grip when in contact with the tire rubber. The above-mentioned patent applications describe a road surfacing material comprising a blend of at least two aggregate materials which have different rates of wear as judged by the aggregate test B.S. 812 1967 in which each aggregate material comprises aggregate particles having a surface micro-texture in the range defined by asperity heights of a minimum texture depth of 5 microns and a maximum texture depth of 500 microns.

As the level of micro-texture of the aggregate increases from that of the polished state towards a texture depth of 5 to 500 microns the wet skid resistance of a road surface using the aggregate improves. Compared with a surface of polished aggregate the rate of tire abrasion for a given tire and maneuver also increases with increasing micro-texture depth, the rate of tire abrasion being a function of the severity of the shear forces generated between the tire and the aggregate.

Aggregates with a micro-texture greater than the range specified in this invention may possess a high wet skid resistance on road or runways, but also tend to cause excessive tread abrasion e.g. abrasion on such a surface can be as high as ten times that on a low micro-textured surface.

Examples of aggregates having a micro-texture in the desired range are Haughmond gritstone (Pre-Cambrian of Shropshire) and certain other Pre-Cambrian and Palaeozoic gritstones including certain types of Millstone Grit.

The polishing of the aggregate which normally occurs under traffic tends to lower the micro-texture of the aggregate particles thus reducing their wet-grip capability.

Thus in the blend of aggregates of different wear rates described above it is necessary for most applications for the aggregates having the lower wear rate to have a high resistance to polishing and advantageous if the aggregate of high wear rate also has a high resistance to polishing. By an aggregate of high resistance to polishing is meant an aggregate of a type which retains a surface micro-texture in the desired range when subject to traffic action preferably over the life of the road surface. This may be achieved with a friable aggregate as e.g. in gritstone where loss of quartz particles from the cementing matrix during wear results in fresh unpolished surface repeatedly being exposed, the surface micro-texture thus remaining substantially unchanged. Alternatively the aggregate may be a hard material whose surface wears away at a negligible rate, such materials being suitable only as the aggregate of the lower wear rate in the road surfacing material of the invention.

When using the mixture of aggregates the preservation of the open macro-structure containing the void channels necessary for sub-tire drainage may suitably be achieved by blending aggregates so that the constituent with the high rate of wear comprises the middle sizes of the aggregate grading.

In the road surfacing materials of this invention may be used all binder contents and binder types and all cement contents and cement types which are used for road surfacing materials.

We have determined that the bulk drainage properties of a road surface are dependent on the following road surface parameters:
(i) the size of the aggregate particles.
(ii) the separation of individual aggregate particles in the binder matrix and p1 (iii) the texture depth of individual aggregate particles in the binder matrix.

It will be appreciated, however, that the properties of the surface cannot be considered alone since the object of achieving good drainage is to improve the grip of a tire on a wet road. Tire parameters affecting the zone of contact between tire and road must therefore also be considered, for example:
(i) the pressure of the tire in the contact patch
(ii) the length and width of the contact patch and
(iii) the modulus of the tire tread rubber so that as large an area as possible of the tire tread rubber is able to contact the particles in the road surface.

Thus, we have now discovered that the bulk drainage properties of a road surface can be considerably improved while maintaining the necessary area of contact between aggregate particles and tire by controlling the size of the individual aggregate particles used and their distribution in the binder matrix.

Accordingly the present invention provides a road surface comprising a blend of at least two aggregate materials disposed in a binder matrix and having different rates of wear as judged by the aggregate abrasion test B.S. 812 1967, each aggregate material comprising individual aggregate particles of a size such that they will be retained on a British Standard ¼ inch sieve, or its metric equivalent, and will pass through a British Standard ¾ inch sieve, or its metric equivalent, and having a surface micro-texture in the range defined by asperity heights in the range 5 to 500 microns, the individual aggregate particles being disposed in the binder matrix so that the shortest distance between any two adjacent particles is 1 to 6 mm and the texture depth of the aggregate particles in the binder matrix is between 1 and 5 mm.

Preferably the shortest distance between any two adjacent particles in the surface is between 1 and 4 mm. Preferably the texture depth of the aggregate particles in the binder matrix is between 1 and 3 mm. Preferably the individual aggregate particles have a size such that they will be retained on a British Standard ¼ inch sieve and will pass a British Standard ½ inch sieve.

The separation and texture depth of the aggregate particles within the binder matrix is dependent upon the size of the larger aggregate particles used. Thus appropriate control of the aggregate grading will ensure that the separation and texture depth of the aggregate particles within the binder matrix, i.e. the surface macro-texture, initially falls within the above range and the use of aggregate materials having different rates of wear ensures that this macro-texture is maintained throughout the life of the surface since the smaller size particles within the grading possess a greater degree of friability compared with the larger size particles. A suitable method for the control of the aggregate grading is described in "The rational design of aggregate gradings for dense asphaltic compositions" by Lees, Proceedings of the Association of Asphalt Paving Technologists Vol. 39 (1970) pps 30–69.

Figure 2:
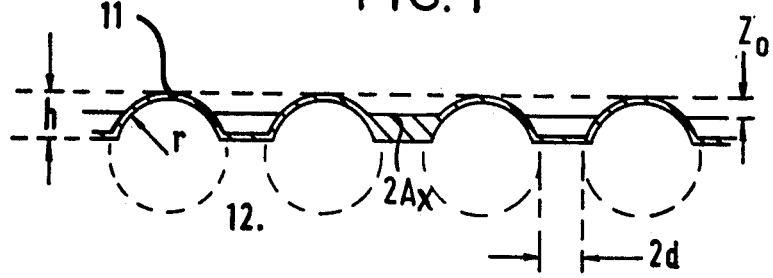

FIG. 1 is a diagrammatic plan view of a road surface showing the aggregate particles 11 disposed in a binder matrix 12, and FIG. 2 is a section through the road surface illustrated in FIG. 1.

The texture depth of the road surface, i.e. the vertical distance which each aggregate particle projects beyond the binder matrix is designated by the reference letter $h$ and the depth to which the rubber of a tire running over the road surface penetrates into the surface is designated by the term $Z_o$.

In the design of a road surface it is desirable to provide as large a drainage area as possible, i.e. to maximize the number of drainage zones, while providing a large surface area for contacting the tire tread. By maintaining the aggregate particle size, the separation between adjacent particles and the texture depth of the aggregate particles in the binder matrix within the above limits, a road surface is obtained which provides for efficient bulk water drainage and adequate contact between the tire and the road surface.

Figure 3:
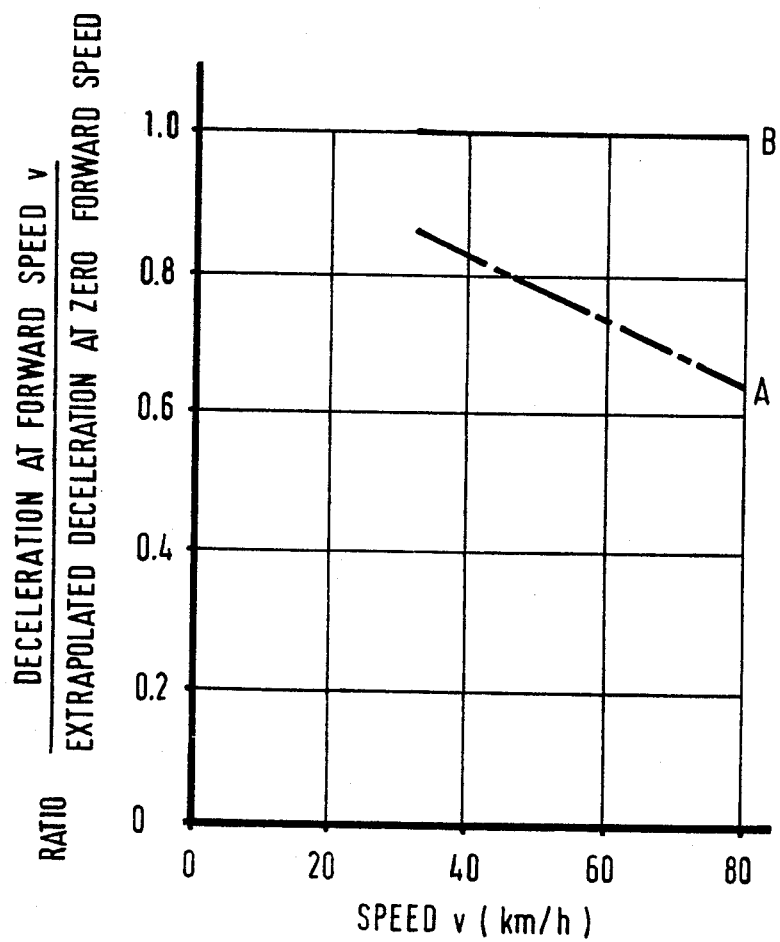

The drainage properties of a road surface according to the present invention can be compared with a standard motorway specification B.S. 594 surface by comparing the peak deceleration obtained for a vehicle running at different speeds over the two surfaces. FIG. 3 shows a graph in which the ratio deceleration at forward speed $v$/extrapolated deceleration at zero forward speed is plotted against the vehicle speed. Plot A shows the results obtained when the vehicle is driven over the B.S. 594 standard motorway surface and Plot B shows the results obtained when the vehicle is driven over the surface according to this invention. In each instance a Ford Escort 1300 G.T. with 165-13 Dunlop CB 73 tires was used. It can be seen from the graph that the drainage properties of the surface according to the present invention are better than those of the B.S. 594 standard motorway surface.

The surface according to the present invention is also superior to the B.S. 594 standard motorway surface in that the continued passage of heavy traffic does not lead to a deterioration in drainage properties through a reduction in macro-texture caused by chipping embeddment or removal.

The road surface described in this Example has also been shown to produce less road noise under dry conditions in comparison with the B.S. 594 standard motorway surface and an increase in passenger comfort due to improved riding characteristics.

FIG. 4 is a graph showing the variation in external noise generation with vehicle speed and compares the sound level for this road surface with the sound level for s B.S. 594 standard motorway surface. It can be seen from the graph that the use of the road surface according to the present invention considerably reduces the external noise generation.

The road surface according to the present invention is capable of being mixed and layed using conventional road material mixing and layer equipment and requires no special skill by the equipment operators.

Having now described our invention — what we claim is:

1. In a road surface comprising a blend of at least two aggregate materials disposed in a binder matrix and having different rates of wear as judged by the aggregate abrasion test B.S. 812 1967, each aggregate material having a surface micro-texture defined by asperity heights in the range 5 to 500 microns, at least a portion of the particles of the slower wearing aggregate being of larger size than any of the particles of the faster wearing aggregate, the improvement wherein each aggregate particle is of a size such that it would be retained on a British Standard ¼ inch sieve, or its metric equivalent, and would pass through a British Standard ¾ inch sieve or its metric equivalent, and wherein the individual aggregate particles are disposed in the binder matrix so that the shortest distance between any two adjacent particles is 1 to 6 mm and the texture depth of the aggregate particles in the binder matrix is between 1 and 5 mm.

2. A road surface as claimed in claim 1 in which the shortest distance between any two adjacent particles in the surface is between 1 and 4 mm.

3. A road surface as claimed in claim 1 in which the texture depth of the aggregate particles in the binder matrix is between 1 and 3 mm.

4. A road surface as claimed in claim 1 in which the individual aggregate particles have a size such that they will be retained on a British Standard ¼ inch sieve and will pass a British Standard ½ inch sieve.

* * * * *